(12) United States Patent
Yoshida et al.

(10) Patent No.: US 7,084,598 B2
(45) Date of Patent: Aug. 1, 2006

(54) DRIVER OF ELECTRIC COMPRESSOR

(75) Inventors: Makoto Yoshida, Kusatsu (JP); Naomi Goto, Otsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/809,508

(22) Filed: Mar. 26, 2004

(65) Prior Publication Data

US 2004/0227482 A1    Nov. 18, 2004

(30) Foreign Application Priority Data

Apr. 28, 2003    (JP)    ............................. 2003-124065

(51) Int. Cl.
    *H02P 23/00*    (2006.01)
    *H02P 25/00*    (2006.01)
    *H02P 27/00*    (2006.01)

(52) U.S. Cl. ...................... 318/779; 318/254; 318/430; 318/432; 318/434

(58) Field of Classification Search ................ 318/779, 318/799, 809
See application file for complete search history.

(56) References Cited

U.S. PATENT DOCUMENTS

| | | | | |
|---|---|---|---|---|
| 5,455,885 A * | 10/1995 | Cameron | ..................... | 388/834 |
| 5,780,983 A * | 7/1998 | Shinkawa et al. | .......... | 318/254 |
| 5,886,486 A * | 3/1999 | Jeong et al. | ................. | 318/257 |
| 6,034,494 A * | 3/2000 | Kitamine et al. | ............ | 318/254 |
| 6,078,158 A * | 6/2000 | Heeren et al. | .............. | 318/430 |
| 6,650,073 B1 * | 11/2003 | Kawabata | .................... | 318/254 |

FOREIGN PATENT DOCUMENTS

| | | |
|---|---|---|
| JP | 6-156055 | 6/1994 |
| JP | 10-47255 | 2/1998 |

* cited by examiner

*Primary Examiner*—Rina Duda
*Assistant Examiner*—Erick Glass
(74) *Attorney, Agent, or Firm*—Wenderoth, Lind & Ponack, L.L.P.

(57) ABSTRACT

A compressor driver for a compressor is provided, wherein at the start of the compressor, a phase of the current flowing in the motor is controlled to be ahead of an induction voltage, then the advancement of the phase is controlled to decrease. Under an unstable condition to detect a position, such as at the start under pressure-difference, the foregoing control allows the phase to advance up to the current-phase where the max. torque can be produced, thereby drawing the instantaneous max. torque of the motor for starting the compressor. Then the control reduces the advancement for obtaining a stable operation.

15 Claims, 22 Drawing Sheets

Induced Voltage $E_U = V_U - R \cdot i_U - L \cdot \dfrac{di_U}{dt}$ (a)

(d)

DRIVER OF ELECTRIC COMPRESSOR

FIELD OF THE INVENTION

The present invention relates to drivers of electric compressors to be used mainly in air-conditioners including a car air-conditioner.

BACKGROUND OF THE INVENTION

A car air-conditioner including an electric compressor (hereinafter referred to simply as a compressor) which employs a sensor-less dc brush-less motor as a driver, is disclosed in, e.g., Japanese Patented Publication No. JP06-156055. This air-conditioner is shown in FIG. 21 which illustrates a schematic structure of this conventional car air-conditioner including a compressor.

In FIG. 21, air duct 101 sucks air from air inlet 103 due to an operation of indoor fan 102, and blows the air through indoor heat exchanger 104 into the compartment of the vehicle through air outlet 105. Heat exchanger 104 disposed in air-duct 101 forms a refrigerating cycle together with compressor 106 driven by a sensor-less dc brush-less motor, four-way switching valve 107 for selecting heating or cooling by switching the flow of refrigerant, and outdoor heat exchanger 110 which exchanges heat of indoor air with that of outdoor air using the operation of throttle 108 and outdoor fan 109.

Air-conditioner controller 112 controls the operations of inverter 111 which operates the sensor-less dc brush-less motor (not shown), i.e., the driver of compressor 106, indoor fan 102, four-way valve 107 and outdoor fan 109.

Air-conditioner controller 112 is connected to various switches such as indoor-fan switch 113 for setting ON/OFF, strong/weak of indoor fan 102; air-conditioning switch 114 for selecting cooling, heating or OFF; and temperature-adjustment switch 115. Controller 112 is also connected to communicator 116 for communicating with a vehicle controller (not shown). In the foregoing structure, e.g., air-blow is started by switch 113, and a weak level of blow is selected, then cooling is instructed by switch 114. Controller 112 sets valve 107 as shown with a solid line in FIG. 21, and works indoor heat exchanger 104 as an evaporator and works outdoor heat exchanger 110 as a condenser, and turns on outdoor fan 109, then operates indoor fan 102 on a weak level.

A temperature of indoor heat exchanger 104 is adjusted in accordance with the setting done by switch 115 taking advantage of variable rpm of compressor 106, where the rpm is varied by inverter 111. When cooling/heating is turned off by switch 114, compressor 106 and outdoor fan 109 are also turned off.

Turning off fan switch 113 turns off indoor fan 102, then compressor 106 and outdoor fan 109 are also turned off for protecting the refrigerating cycle. On the other hand, an instruction of turning off the air-conditioner is given from a vehicle controller (not shown) via communicator 116 in order to save power or protect the battery, wherein controller 112 handles this instruction in the same manner as turning off the air-conditioner by switch 114.

When inverter 111 is powered at 120-degree interval drive, the magnetic field changes at 60-degree intervals (power is fed at 60-degree intervals), so that the sensor-less dc brush-less motor (not shown), which drives compressor 106, tends to produce fluctuations in torque.

A circuit of this power feeding at 120-degree intervals is shown in FIG. 22, where inverter 111 is coupled with battery 121 (power supply). The dc brush-less motor is operated by inverter switching-element 122 coupled to battery 121 and the controlling of inverter diode 123. The dc brush-less motor comprises stator winding 124 and magnet rotor 125, and is coupled to battery 121 via inverter 111.

Inverter 111 comprises the following elements:

current sensor 126 for detecting a current of the power supply, thereby calculating a power consumption and protecting the switching elements;

phase shift circuit 127 for detecting a position of magnet rotor 125 from a voltage of stator winding 124; and phase comparison circuit 128.

Control circuit 129 controls ON/OFF of switching element 122 based on signals supplied from sensor 126 and circuit 128.

The car air-conditioner including the foregoing compressor is subject to a thermal load environment different from that of a room air-conditioner. Although a vehicle has a small compartment, it has a rather large area occupied by windows. Since a vehicle travels frequently through a sunny place and shade, it is subject to solar radiation, and the thermal load in the compartment fluctuates frequently. The start/stop of operating the compressor depends on switch 114, switch 113, or a temperature adjusting operation set by switch 115, so that the compressor mounted in a car is frequently started or stopped compared with that of a general room air-conditioner.

Since the compressor mounted in a car is frequently started or stopped, it is required to start or stop before a high pressure side and a low pressure side of the refrigerating cycle are balanced with each other. In other words, the compressor is started frequently while a large pressure difference still remains.

Therefore, the driver of the compressor mounted in a car needs performance considering every possible operating condition, in particular, the performance of starting the compressor even if a large pressure difference still remains. This performance is hereinafter referred to as start-performance under pressure difference.

To be more specific, the compressor using HFC134a refrigerant is required to start even if the difference between a discharge pressure and a suction pressure is as high as 2.0 MPa. This pressure difference is as much as several times that of a driver of a general room air-conditioner which does not need the start-performance under pressure difference. A method of boosting start-torque by increasing a voltage (duty ratio) at the start is proposed for a conventional driver of a compressor, e.g., disclosed in Japanese Patent Application Non-Examined Publication No. JP10-7255. In this case, a starting current also increases, so that a threshold value for current protection also increases.

However, the methods of increasing only a starting voltage, a duty ratio, or a current threshold value for improving the start-performance under pressure difference involves increasing the current in a large amount at the same time. Therefore, those methods can start the compressor under a certain level of pressure difference (according to the experience, the compressor can be started under the pressure difference up to 0.8 MPa). However, when the pressure difference in the refrigerating cycle exceeds the certain level, an over-current protection is activated, so that the compressor cannot start.

The rotor fails in following the rotating magnetic field due to a large torque load, so that the compressor falls in out of sync. at the start. Once the compressor falls in this state, a positional detection becomes unstable, which disables the compressor from starting.

If the compressor cannot start, the crew and passengers of the vehicle have to wait until the pressure difference in the refrigerating cycle falls within a range allowing the start. During the waiting time, the temperature of the compartment rises in the condition of cooling operation, so that the crew and passengers feel uncomfortable. The vehicle has a large area occupied by windows, so that it is subject to solar radiation and the thermal load frequently fluctuates in the compartment. As a result, the crew and passengers feel much more uncomfortable.

SUMMARY OF THE INVENTION

The present invention addresses the problems discussed above, and aims to provide a compressor driver featuring start-performance sufficient to drive the compressor under pressure difference.

The driver of the present invention has a structure such that it drives a motor for driving a compressing mechanism which sucks, compresses and discharges fluid. At the start of driving the compressing mechanism, the driver controls such that a current phase of winding of the motor advances uniquely from an induction-voltage phase generated at the winding, and then the advancement of the winding current-phase decreases.

Under an unstable condition in which a large pressure difference tends to remain, the foregoing structure allows the current phase to advance uniquely to a certain level, where starting torque sufficient to start the compressing mechanism under a pressure difference can be generated. Then the motor produces the sufficient torque to start the compressing mechanism. In order to deal with unstable fluctuation of the torque, the advancement of the current phase is reduced, so that the compressing mechanism operates in a stable manner. As a result, the driver can exert its start-performance under pressure difference, and the compressor can be positively started.

The compressor driver of the present invention can decrease the advancement of the winding current-phase in either one of the following cases: (a) a lapse of a given time; (b) an rpm of the motor reaches a given rpm. This structure allows decreasing of the current phase after starting the compressor, thereby controlling the compressor not to fall into an unstable operation. As a result, the compressor can stay in a stable operation.

The compressor driver of the present invention can draw the maximum instantaneous torque from the motor depending on an advancement of the winding current-phase. This structure allows starting the compressor such that the maximum instantaneous torque can be uniquely produced by the motor, so that the compressor can be positively started even if a large pressure difference in the refrigerating cycle still remains.

The compressor driver of the present invention switches a dc voltage supplied from a dc power supply, thereby outputting an ac (alternating current) in sine waveform to the sensor-less dc brush-less motor. Detection of a current running through the stator winding allows determining a position of the rotor having permanent magnets of the sensor-less dc brush-less motor, so that the switching of the dc voltage can be controlled. This structure allows each carrier to detect a position of the rotor and to adjust an output, so that the start-performance can be further improved.

The compressor driver of the present invention carries out switching with three-phase modulation. This structure makes a carrier frequency be equivalent to being doubled, so that a smooth current can be expected. As a result, smaller torque fluctuation is produced and the start-performance can be improved.

The compressor driver of the present invention is mountable to a car air-conditioner. This structure ensures to drive the compressor positively in a vehicle which is subject to a severe condition including load fluctuation of the refrigerating cycle. As a result, the driver improves the performance and function of the car air-conditioner.

DETAILED DESCRIPTION OF THE INVENTION

Best Mode for Carrying out the Invention

A driver of a compressor mounted in a car air-conditioner in accordance with an exemplary embodiment of the present invention is demonstrated hereinafter with reference to the accompanying drawings.

Exemplary Embodiment

An electric circuit in accordance with the exemplary embodiment of the present invention is described with reference to FIG. 1, which shows a schematic circuit diagram of the compressor driver in accordance with the embodiment of the present invention.

Figure 1:
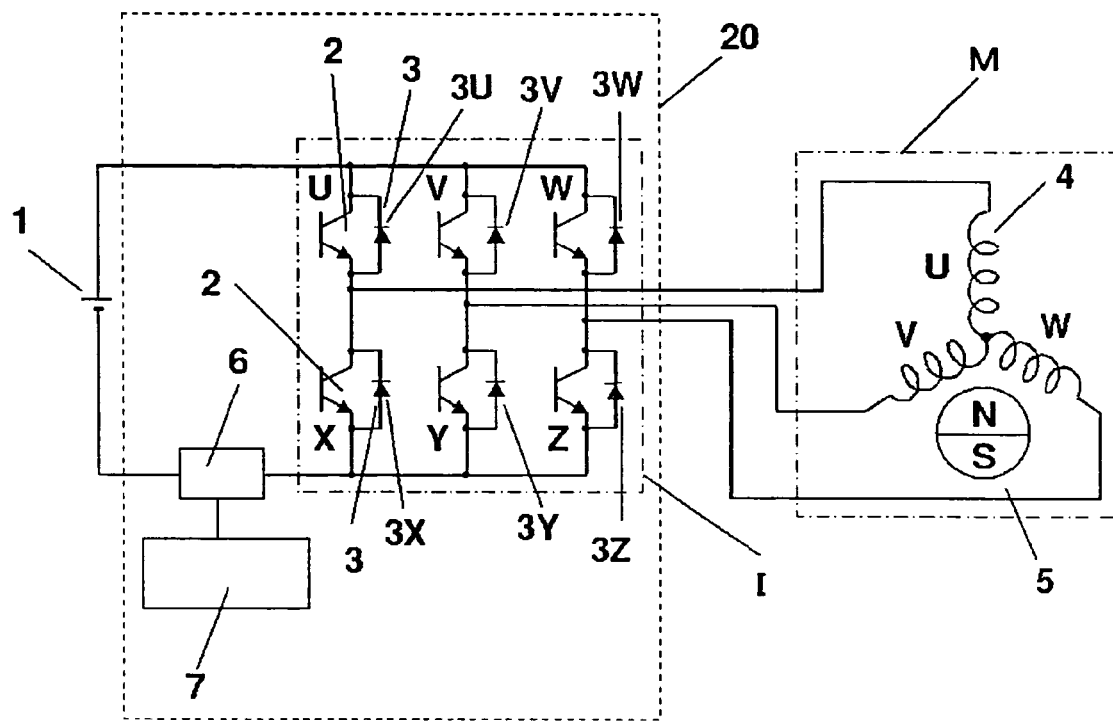
FIG. 1 shows a schematic circuit diagram of a compressor driver in accordance with an exemplary embodiment of the present invention.

In FIG. 1, inverter 20 is coupled with battery 1, i.e., a power supply, and sensor-less brush-less motor M (hereinafter referred to simply as a motor). Inverter 20 comprises the following elements:

inverter module I;

current sensor 6 for detecting a current necessary to drive motor M; and control circuit 7 for controlling switching elements 2 based on signals supplied from current sensor 6.

Inverter module I includes the following elements:

plural switching elements 2 for operating the inverter, elements 2 being coupled to battery 1; and diodes 3 for operating the inverter.

Switching elements 2 comprises the following elements:

upper switching elements U,V, W;

lower switching elements X, Y, Z; and diodes 3U, 3V, 3W, 3X, 3Y, and 3Z, respectively coupled between the source and drain of each one of the upper and lower switching elements.

Motor M comprises stator winding 4 and magnet rotor 5.

Figure 22:
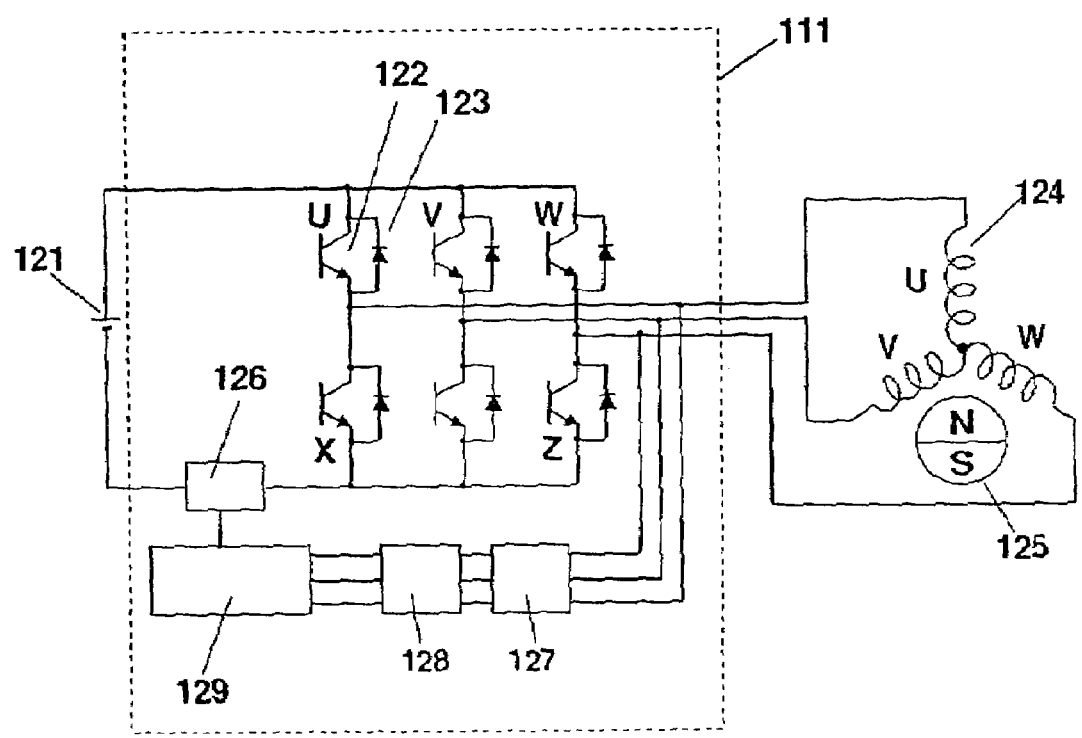
FIG. 22 shows a circuit diagram of driving at 120-degree intervals of a car air-conditioner employing a prior art compressor.

The circuit of the compressor driver of the present invention shown in FIG. 1 is compared with the circuit in FIG. 22 for driving the conventional compressor at 120-degree intervals. The comparison reveals that the circuit shown in FIG. 1 eliminates phase comparing circuit 128 and phase-shift circuit 127.

Figure 21:
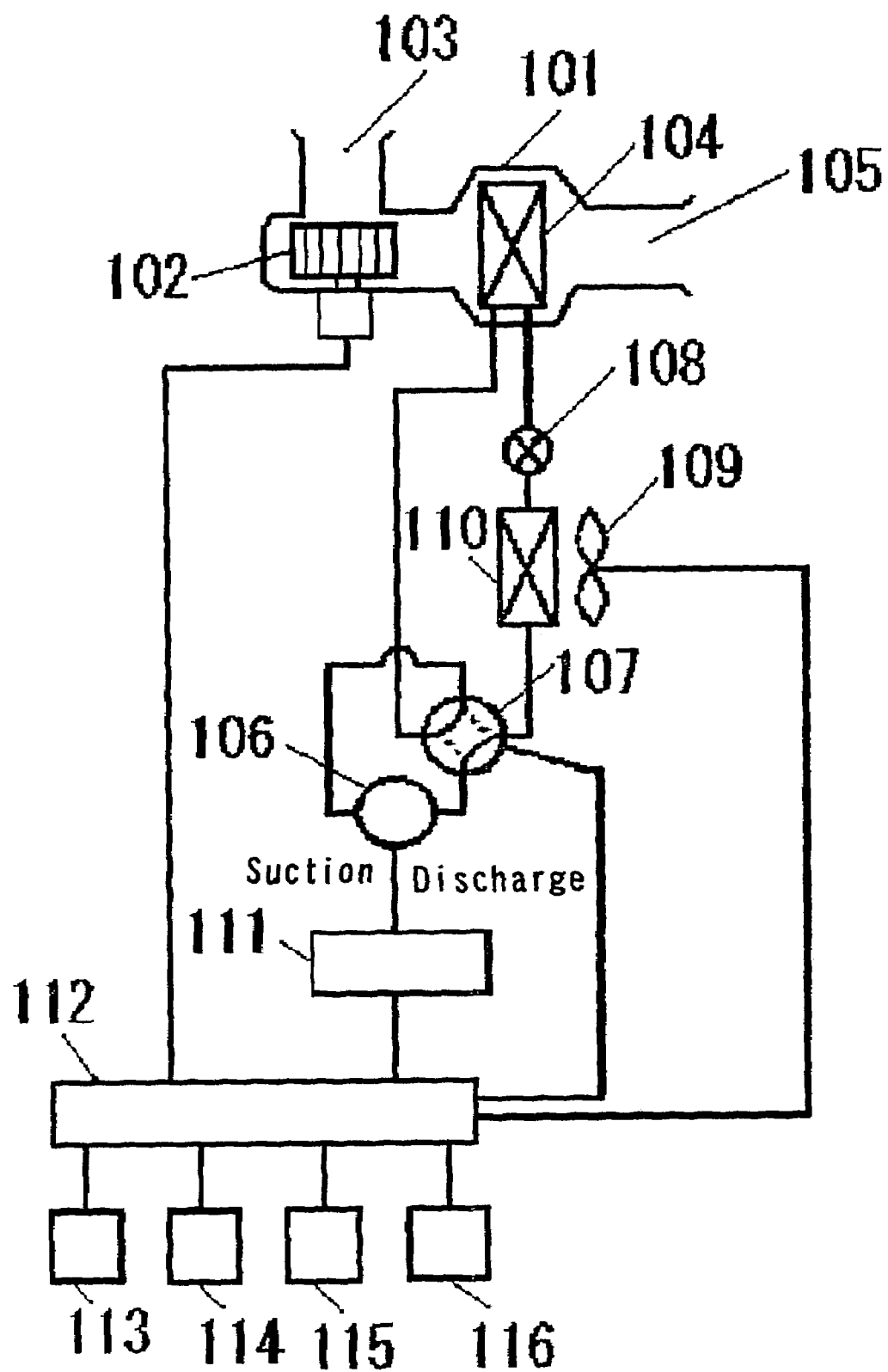
FIG. 21 shows a structure of a car air-conditioner employing a prior art compressor.

In FIG. 1, a current value detected by sensor 6 is sent to control circuit 7, and is used for calculating a power consumption or protecting switching elements 2, and the current value detected is also used for detecting a position of magnet rotor 5 of motor M. Control circuit 7 controls the power-feeding to switching elements 2 based on an rpm instruction signal (not shown) in order to carry out a temperature adjustment set by temperature-adjustment switch 115 shown in FIG. 21, which shows a schematic structure of a conventional car air-conditioner. Meanwhile, current sensor 6 can be anything like a sensor using a Hall element or a shunt resistor, which can detect a peak value of the switching current produced by switching elements 2. In FIG. 1, sensor 6 is disposed at the minus side of the power line; however, since the current is the same, it can be disposed at the plus side.

The foregoing structure allows comparing circuit 128 and phase-shift circuit 127 from the conventional compressor driver to be eliminated, so that the driver of the present invention can be not only downsized and reduced in weight, but also improved in reliability, such as being more vibration proof.

Figure 2:
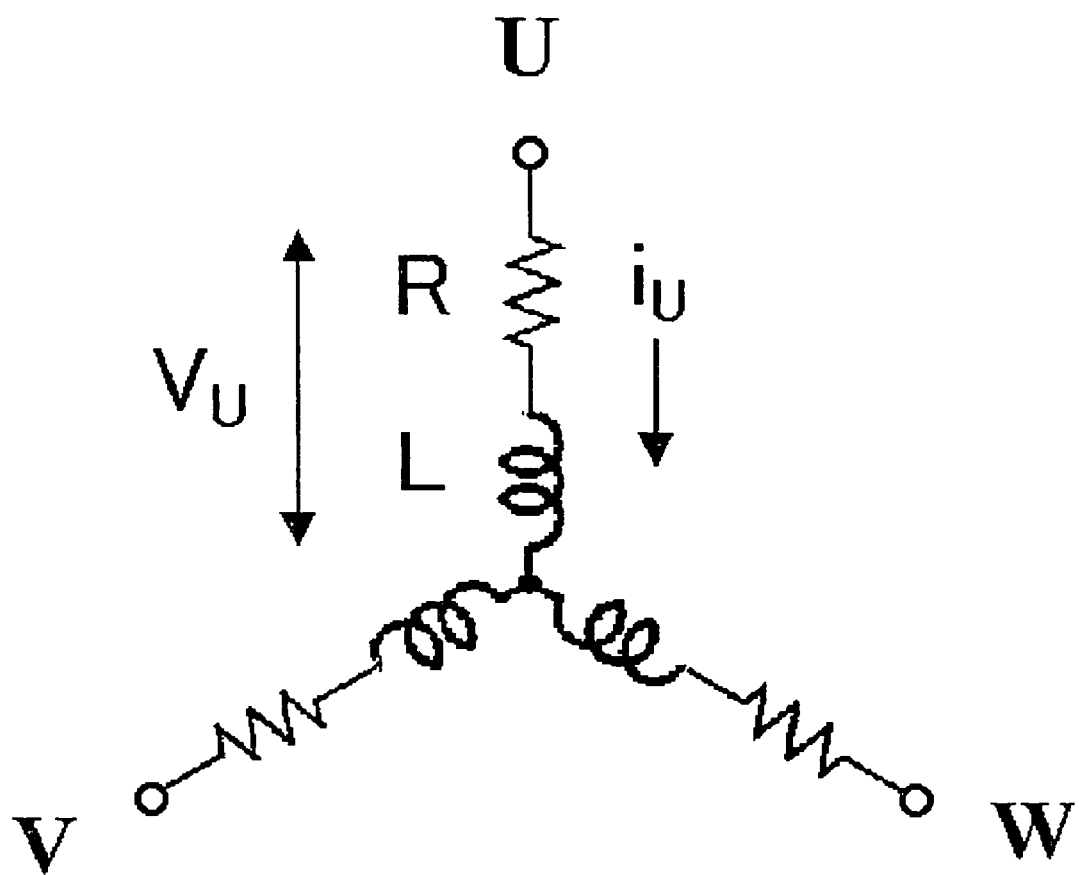
FIG. 2 illustrates a relation between phase-current $i_u$ and induction voltage Eu of phase-U in a compressor driver in accordance with an exemplary embodiment of the present invention.

Next, a method of detecting a position of magnet rotor 5 of motor M shown in FIG. 1 is demonstrated hereinafter. FIG. 2 illustrates a relation between phase-current $i_u$ and induction voltage $E_u$ of phase-U in the compressor driver in accordance with the embodiment of the present invention. Induction voltage $E_u$ is induced at stator winding 4 by the rotation of magnet rotor 5 shown in FIG. 1, so that the position of rotor 5 can be determined by monitoring a signal of the induction voltage.

Figure 3:
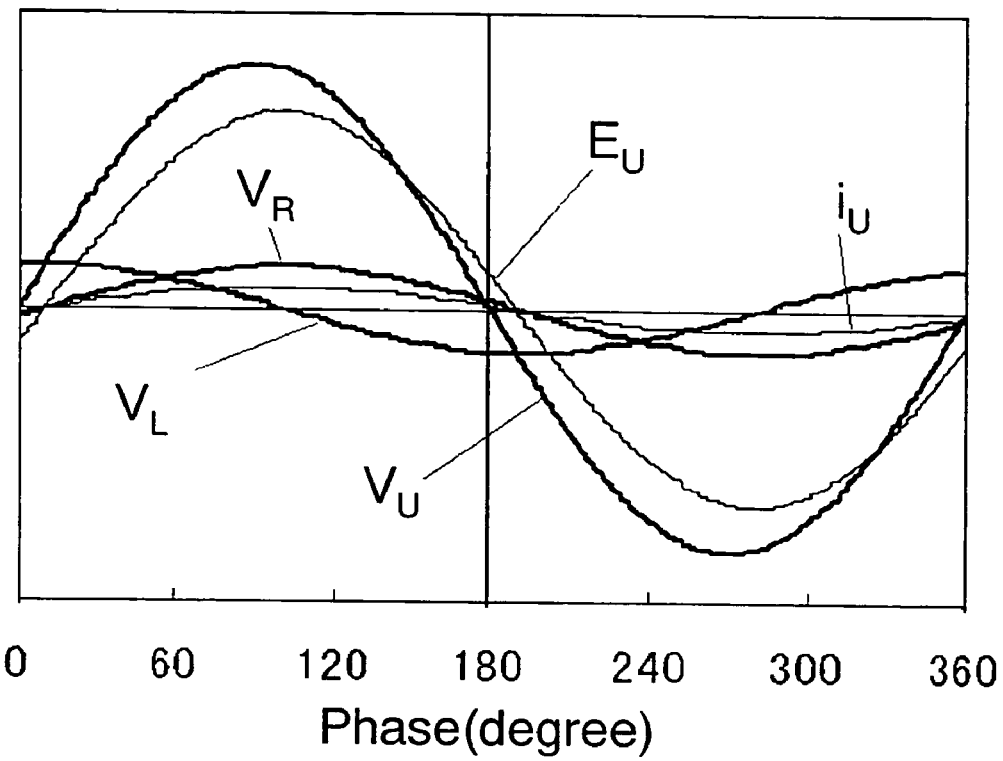
FIG. 3 shows waveforms of a voltage and a waveform of current by one-phase of a sensor-less dc brush-less motor in accordance with an exemplary embodiment of the present invention.

In FIG. 1, stator winding 4 has inductance L and resistance R as shown in FIG. 2. The sum of induction voltage $E_u$, a voltage induced at inductance L, and a voltage across resistor R equals to a voltage applied by inverter 20. The voltage across resistor R is expressed as $R \cdot i_u$ (iu=phase current), and the voltage induced across inductance L is expressed as $L \cdot di_u/dt$, so that the voltage (Vu) applied by inverter 20 is expressed as follows:

$Vu = E_u + R \cdot i_u + L \cdot di/dt$. Thus, the induction voltage Eu can be expressed as $E_u = V_u - R \cdot i_u - L \cdot di_u/dt$ Control circuit 7 shown in FIG. 1 controls switching elements 2, and a value of applied voltage Vu is known. Thus, pre-set values of inductance L and resistor R in the program software, i.e., a calculating means installed in control circuit 7, will calculate induction voltage $E_u$ only by detecting phase-U current $i_u$. FIG. 3 shows voltages and a waveform of current by one phase of motor M.

Figure 4:
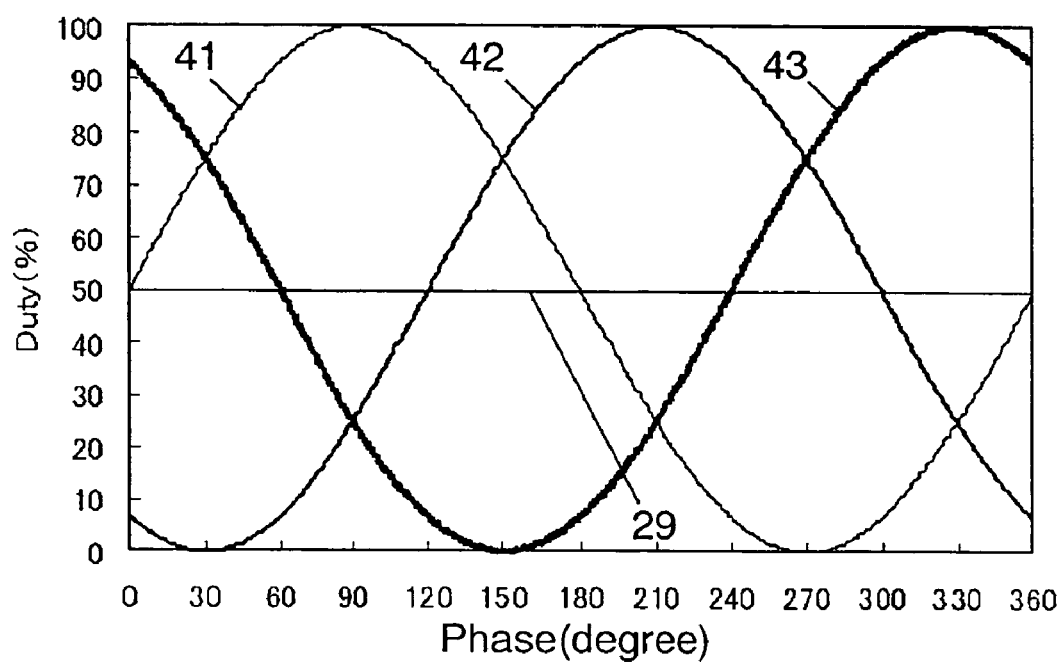
FIG. 4 depicts waveforms showing modulations in respective phases at the maximum modulation 100% of three-phase modulation in accordance with an exemplary embodiment of the present invention.
Figure 5:
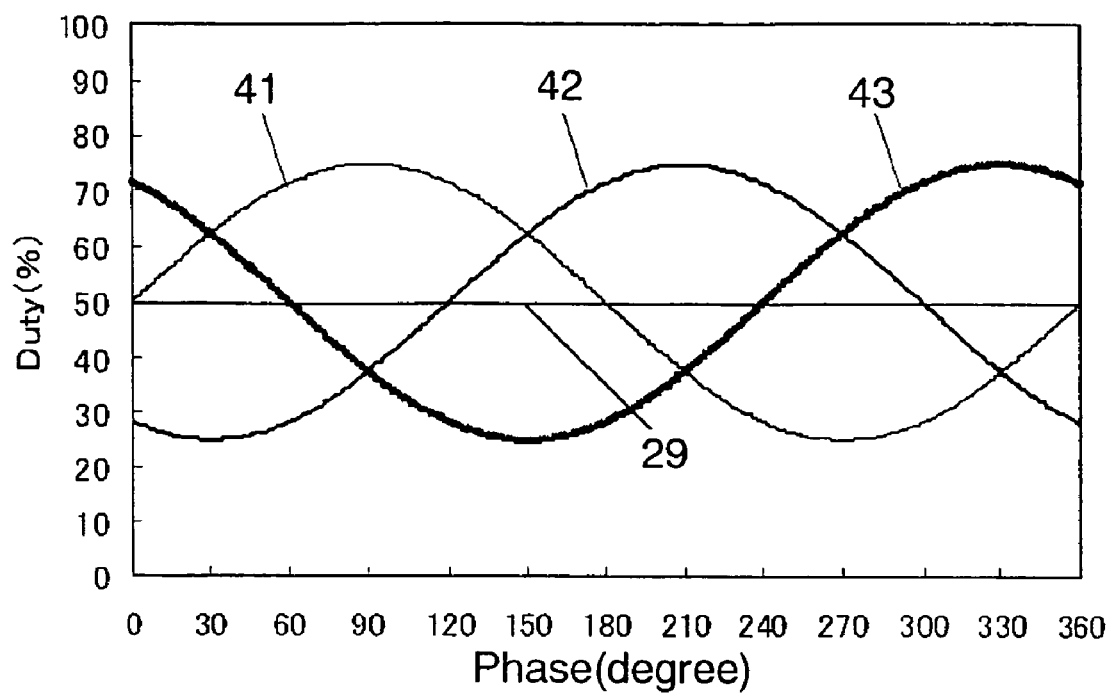
FIG. 5 depicts waveforms showing modulations in respective phases at the maximum modulation 50% of three-phase modulation in accordance with an exemplary embodiment of the present invention.
Figure 6:
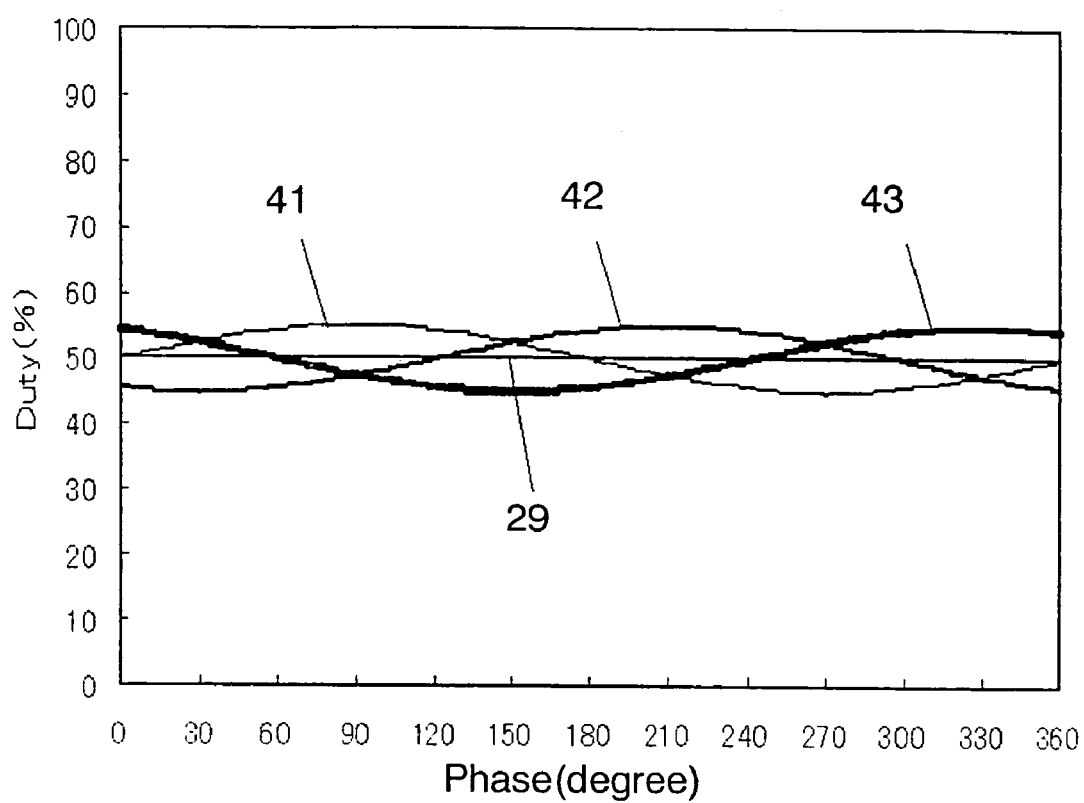
FIG. 6 depicts waveforms showing modulations in respective phases at the maximum modulation 10% of three-phase modulation in accordance with an exemplary embodiment of the present invention.

Next, a method of detecting a position of magnet rotor 5 with current sensor 6 is demonstrated hereinafter. FIG. 4 through FIG. 6 show respective waveforms of three-phase modulation with phase-U terminal voltage 41, phase-V terminal voltage 42, phase-W terminal voltage 43 and neutral-point voltage 29. FIG. 4 shows the maximum modulation 100%, FIG. 5 shows the maximum modulation 50%, and FIG. 6 shows the maximum modulation 10%.

Figure 7:
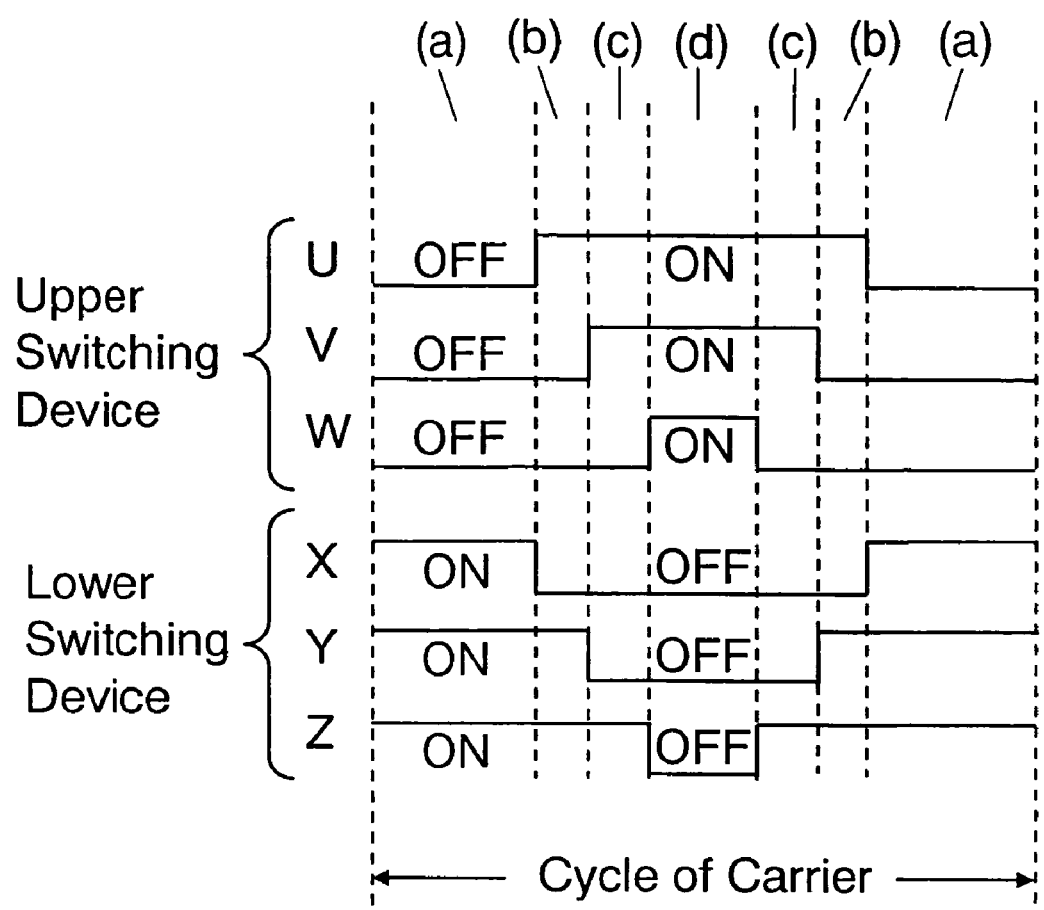
FIG. 7 shows a timing chart illustrating a method of detecting a phase current in accordance with an exemplary embodiment of the present invention.

Detection of current by sensor 6 is detailed here. FIG. 7 shows a timing of power-feeding within one carrier (carrier cycle) to upper switching elements U, V, W and lower switching elements X, Y, Z. In this case, the maximum modulation of 50% shown in FIG. 5 is powered at approx. 130-degree. Because of the three-phase modulation, patterns (a), (b), (c) and (d) as shown in FIG. 7 are set as feeding patterns.

Figure 8:
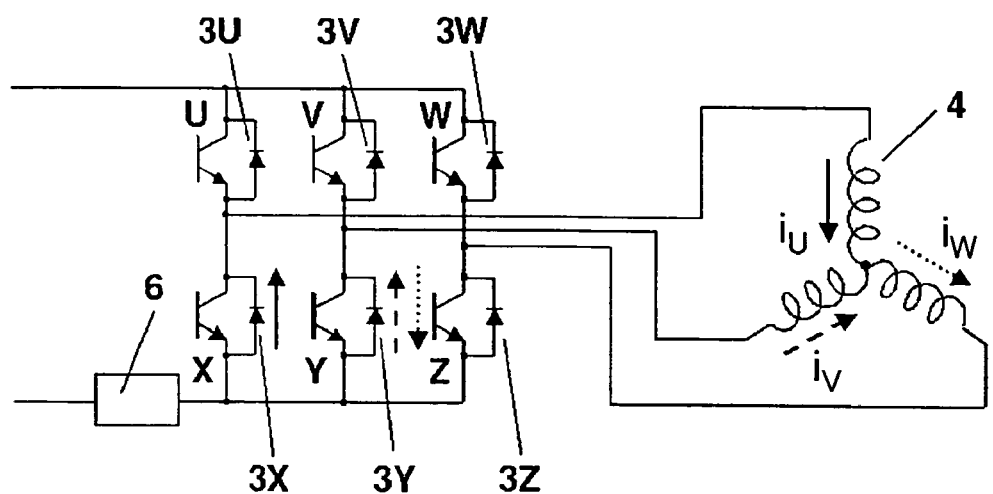
FIG. 8 shows a circuit diagram illustrating a current path in power-feed timing (a) shown in FIG. 7.

FIG. 8 shows a current flow in feeding pattern (a), i.e., upper switching elements U, V, W are all OFF, and lower switching elements X, Y, Z are all ON. In this case, phase-U current $i_u$ and phase-V current iv flow respectively from diodes 3X, 3Y disposed in parallel with lower switching elements X, Y to stator winding 4. Phase-W current $i_w$ flows from stator winding 4 to lower switching element Z, so that the current circulates within this route. As a result, no current flows through sensor 6, so that no current is detected.

Figure 9:
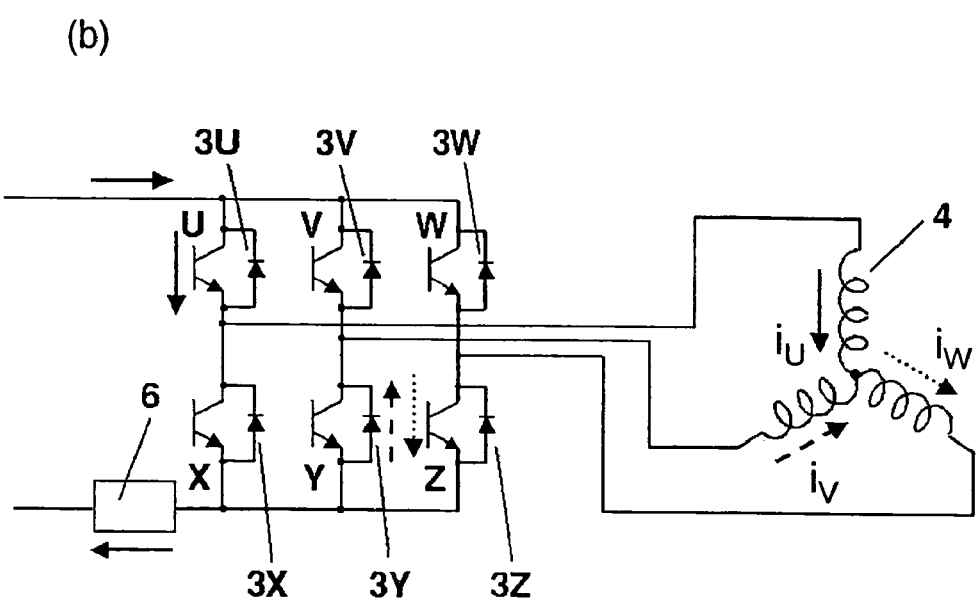
FIG. 9 shows a circuit diagram illustrating a current path in power-feed timing (b) shown in FIG. 7.

Next, in the case of feeding pattern (b) moved from pattern (a), the current-flow is shown in FIG. 9, i.e., upper switching element U is ON, and lower switching elements Y, Z are ON. In feeding pattern (b), phase-U current $i_u$ flows from element U to stator winding 4, phase-V current iv flows from diode 3Y disposed in parallel with element Y to stator winding 4, and phase-W current $i_w$ flows from stator winding 4 to element Z. Thus phase-U current $i_u$ flows through sensor 6, so that the current value is detected.

Figure 10:
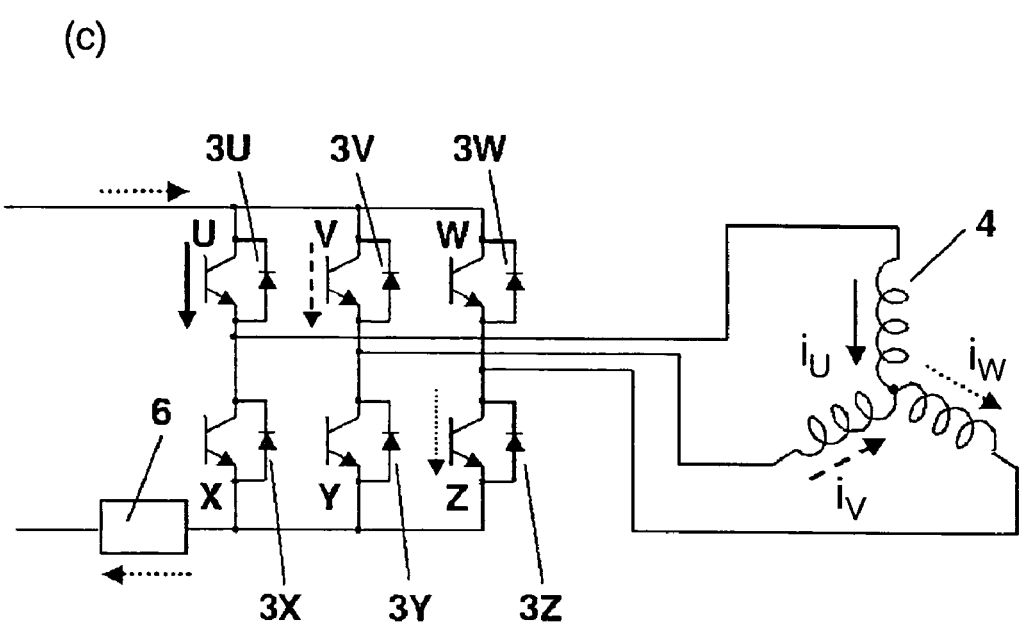
FIG. 10 shows a circuit diagram illustrating a current path in power-feed timing (c) shown in FIG. 7.

In the case of feeding pattern (c) moved from pattern (b), the current-flow is shown in FIG. 10, i.e., upper switching elements U, V are ON, and lower switching element Z is ON. In feeding pattern (c), phase-U current iu and phase-V current iv flow respectively from elements U, V to stator winding 4, and phase-W current $i_w$ flows from stator winding 4 to element Z. Thus, phase-W current $i_w$ flows through sensor 6, so that the current value is detected.

Figure 11:
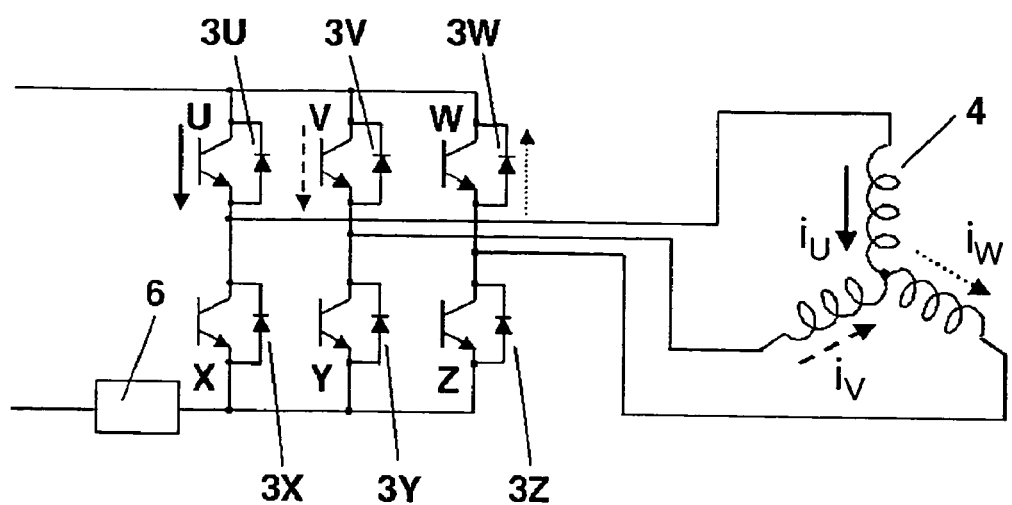
FIG. 11 shows a circuit diagram illustrating a current path in power-feed timing (d) shown in FIG. 7.

In the case of feeding pattern (d) moved from pattern (c), the current-flow is shown in FIG. 11, i.e., upper switching elements U, V, W are all ON, and lower switching elements X, Y, Z are all OFF. In feeding pattern (d), phase-U current $i_u$ and phase-V current iv flow respectively from elements U, V to stator winding 4, and phase-W current $i_w$ flows from stator winding 4 to diode 3W disposed in parallel with element W. The current circulates in this route. Thus, no current flows through sensor 6, so that no current is detected.

As discussed above, phase-U current $i_u$ and phase-W current $i_w$ are detected by current sensor 6, so that remaining phase-V current iv can be found using Kirchhoff's law at the neutral point on stator winding 4. In this case, phase-U current $i_u$ flows into the neutral point on stator winding 4, and phase-W current $i_w$ flows out from the neutral point of stator winding 4. Thus, phase-V current iv can be found from the difference between iu and iw.

The current detection discussed above can be carried out at each carrier, so that a position can be detected at each carrier and an output to stator winding 4 can be adjusted. Therefore, the compressor driver of the present invention, which uses the method of detecting a position of the magnet rotor with the current sensor, has smaller torque fluctuations and better start-performance than those of the conventional one which uses 120-degree intervals for power-feeding.

Further, in the three-phase modulation, as discussed above, since the current circulates in inverter module I and stator winding 4 during feeding patterns (a) and (d) within a carrier cycle, the power current (the current flowing through sensor 6) does not flow. Thus, the power is fed twice, i.e., in the first half and the latter half of a carrier cycle. It is equal to doubling the carrier frequency, and the current fluctuation becomes smooth. In other words, the three-phase modulation produces smaller torque fluctuations and better start-performance than a two-phase modulation.

Figure 12:
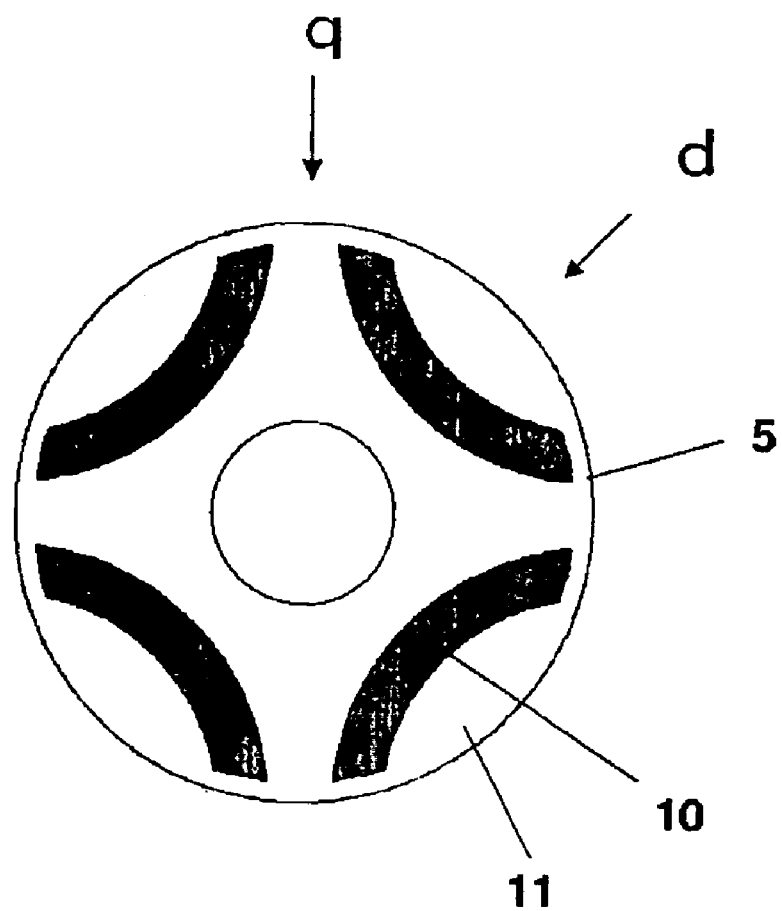
FIG. 12 shows a structure of a magnet rotor of an IPM motor in accordance with an exemplary embodiment of the present invention.

Next, the torque for driving magnet rotor 5 is described hereinafter. FIG. 12 shows magnet rotor 5 of an IPM (interior permanent magnet) motor in which magnets are buried in magnet rotor 5. Rotor 5 comprises permanent magnets 10 and magnet rotor-cores 11. Since the IPM motor has interior permanent magnets 10 in rotor 5, an inductance viewed from the stator winding varies depending on a position of rotor 5. To be more specific, there are two positions, one is a position (direction "d" in FIG. 12) where the inductance is blocked by a magnet having a large magnetic reluctance to flow through a magnetic path, and the other one is a position (direction "q") where the inductance flows through a silicon steel plate having a small magnetic reluctance. This difference in the inductance produces reluctance torque.

Figure 13:
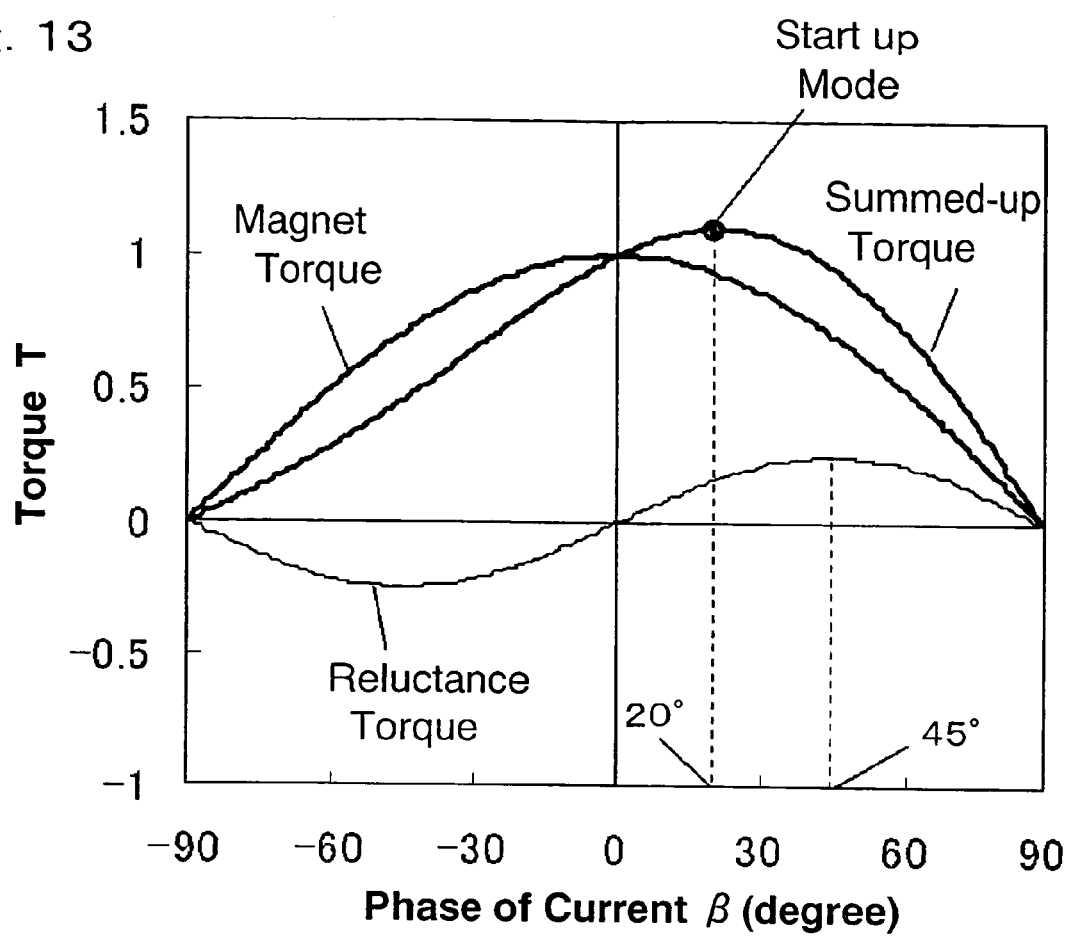
FIG. 13 shows characteristics of current-phase and torque at start up mode in accordance with an exemplary embodiment of the present invention.

FIG. 13 shows a relation of the torque given off by the IPM motor to phase difference β (current-phase) between the induction voltage and the phase current of stator winding 4 of the IPM motor. In FIG. 13, when the current phase stays in the plus region (right hand side of β=0 in FIG. 13), rotor 5 (induction voltage) is behind the current. On the other hand, when the current phase stays in the minus region (left hand side of β=0 degree in FIG. 13), rotor 5 (induction voltage) is ahead of the current. The magnet torque reaches its maximum at β=0 degree, and the reluctance torque reaches 0 (zero) at β=0 degree, reaches its maximum at β=45 degrees, and reaches a maximum on the minus side at β=−45 degrees. In the case shown in FIG. 13, the total torque of the magnet torque and the reluctance torque reaches the maximum at the point shifted toward the right by approx. 20 degrees.

In general, magnet torque is proportionate to current, and reluctance torque is proportionate to current squared. The instance shown in FIG. 13 takes place in a start-up mode, where a current not less than 20 A often flows as a starting current, namely, a large current flows in starting. In this case, the total torque reaches the maximum at β=20 degrees.

As a result, the switching of the inverter is preferably controlled to achieve β=20 degrees in order to improve the start-performance under pressure difference in the start-up mode. This control mode is referred to as a start-up mode.

In this embodiment, a maximum point for giving off the maximum torque is selected so that the driver can start positively under the pressure difference. However, instead of this selection, a phase can be advanced uniquely to a current phase (e.g., β=18 degrees in FIG. 13) where starting torque can be produced enough for the start under the pressure difference. In the instance shown in FIG. 13, the phase can be set within the range which does not exceed 20 degrees, i.e., the maximum torque. This is preferable for stable operation of the motor and for saving power.

Table 1 lists experimental data showing a relation between current-phase at the starting and a pressure difference allowable for the starting. The experiment reveals that the pressure difference allowing the start reaches the maximum at current-phase β=20 degrees. At β=10 degrees and β=30 degrees, the pressure difference reaches the same value allowing the start. Those results are in accordance with the characteristics shown in FIG. 13.

TABLE 1 experimental data showing relations between current-phase and pressure difference allowing the start

| Phase-current at the start | Pressure difference allowing the start (just before the compressor is turned off) | Remarks |
|---|---|---|
| 0 degree | 1.5 MPa | |
| 5 degrees | 1.7 MPa | |
| 10 degrees | 2.0 MPa | |
| 15 degrees | 2.2 MPa | |
| 20 degrees | 2.3 MPa | Phase set at the start |
| 30 degrees | 2.0 MPa | |

Figure 14:
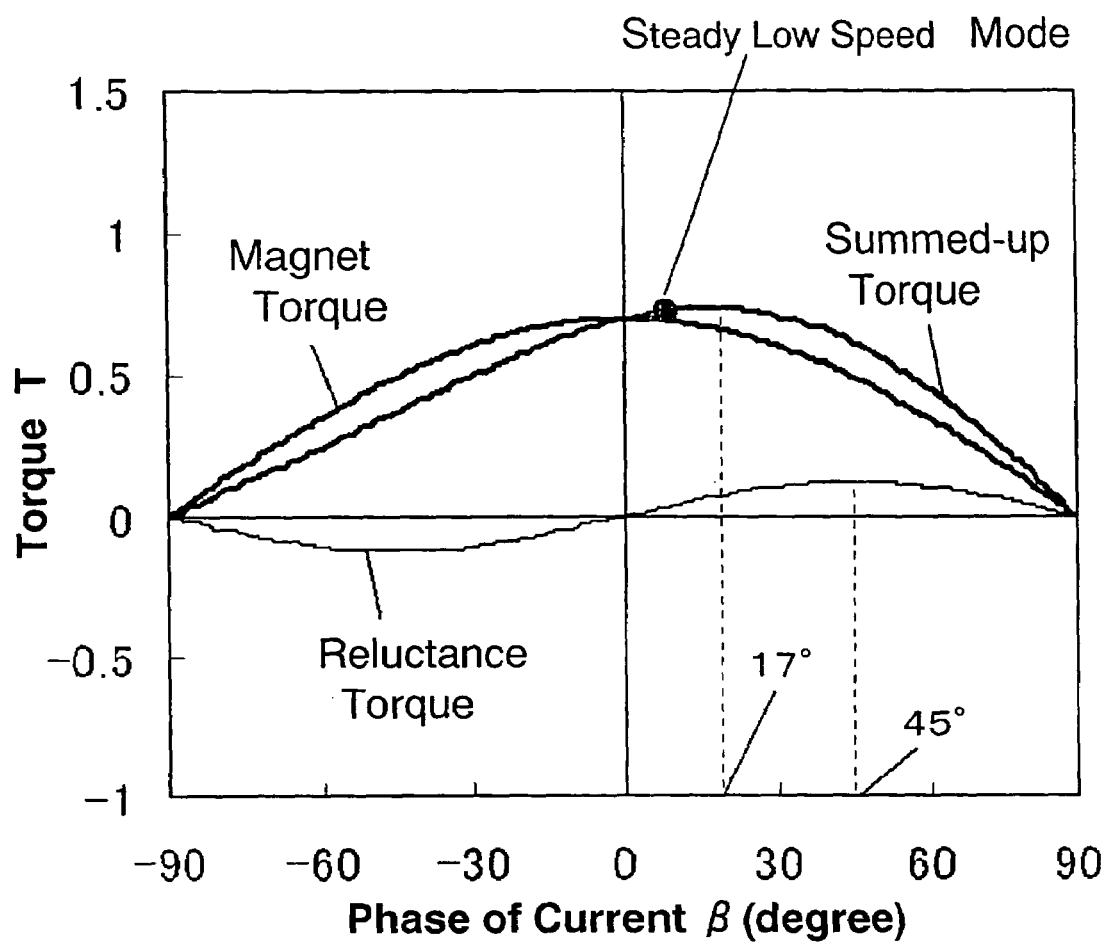
FIG. 14 shows characteristics of current-phase and torque at steady low speed mode in accordance with an exemplary embodiment of the present invention.

Note:
Compressor's exhaust capacity: 20 cc, Refrigerant: HFC134a
Motor: dc brush-less motor with concentrated winding FIG. 14 shows relations between phase-difference β (current-phase) and the torque directly after the start. Directly after the start, the current lowers to approx. 15 A, so that magnet torque and reluctance torque also lower. Since the reluctance torque in particular is proportionate to the current squared, it lowers so much that the maximum point of the total torque shifts to the left. In the instance shown here, the maximum point shifts to the point of β=17 degrees.

As a result, it can be considered that the switching of the inverter is controlled to be at β=17 degrees directly after the start; however, this control simply results in lowering the torque because of the following reasons, and as a result, rotor 5 delays in rotation, and eventually, rotor 5 stops rotating.

The reason is this: in general, directly after the start, the rpm does not reach a high enough level yet, so that the motor is still in an unstable rotating status. The refrigerating cycle has also restarted from the state in which a large pressure difference between the high-pressure side and the low-pressure side remained. Thus, the condenser's fan has restarted and the condensing operation still remains in an unstable status. In such a condition, when the switching of inverter 20 is controlled such that β=17 degrees is achieved immediately after the start, a delay in rotating of rotor 5 due to torque fluctuation (causing larger current-phase β) will lower the torque.

Therefore, immediately after the start, the switching of the inverter is preferably controlled such that the compressor can be operated steadily. For this purpose, in this embodiment, the switching of inverter 20 is controlled at the current-phase enough away to the left from the maximum point of the total torque. To be more specific, a small enough current-phase such as β=5 degrees is used as shown in FIG. 14, so that a delay in rotating of rotor 5 due to torque fluctuation (causing a larger current-phase β) will increase the torque, and the delay of rotor 5 can be cancelled. If rotor 5 is ahead of current (corresponding to a smaller current-phase β), the torque decreases and the advancement of rotor 5 can be cancelled. As a result, the motor is controlled to rotate steadily, in particular, immediately after the start, so that the compressor can start in a stable manner. This control mode is referred to as a steady low-speed mode.

Figure 15:
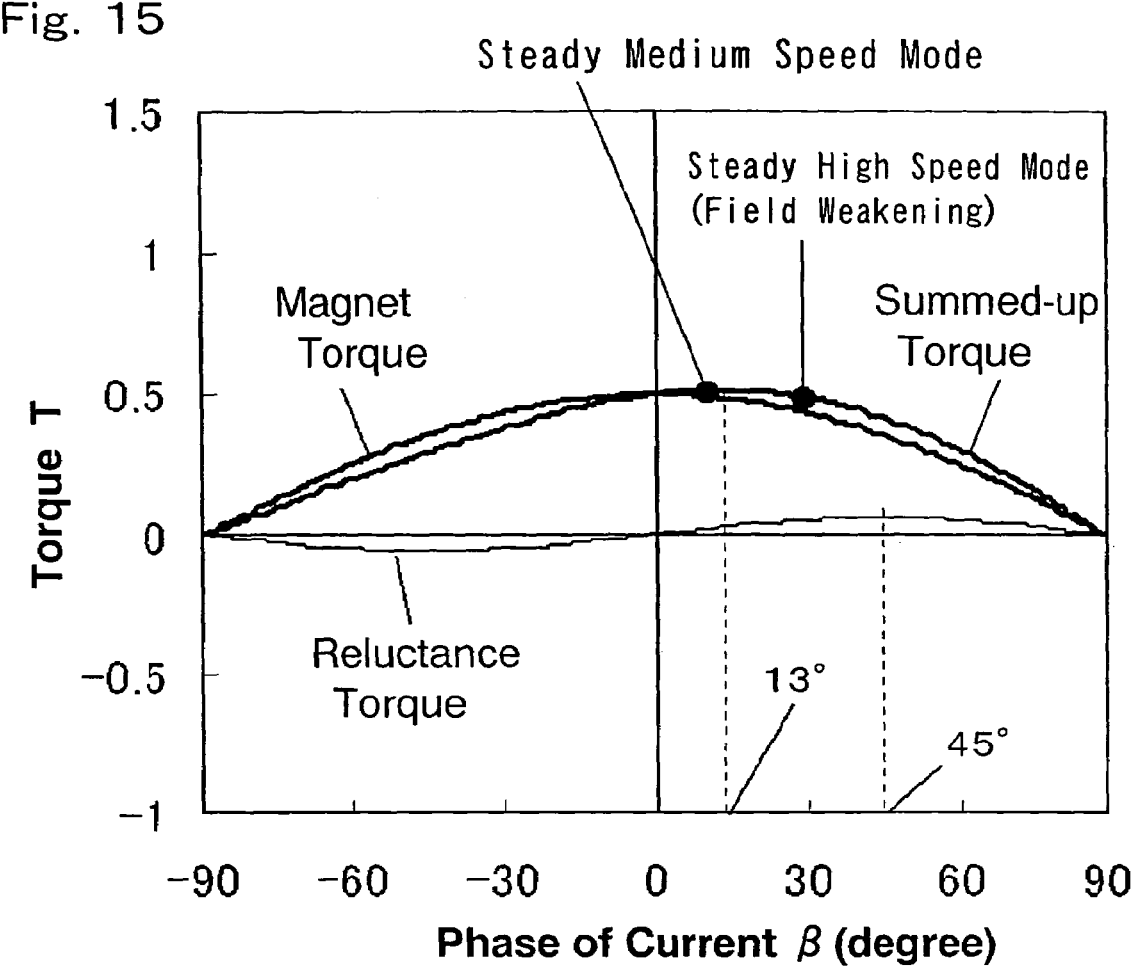
FIG. 15 shows characteristics of current-phase and torque at steady medium speed mode and at steady high speed mode in accordance with an exemplary embodiment of the present invention.

FIG. 15 shows relations between phase-difference β (current-phase) and the torque during steady rotation of the motor. During this steady period, the current decreases in general to approx. 10 A. The magnet torque as well as the reluctance torque also decreases; however, since the reluctance torque decreases much greater, the maximum point of the total torque shifts to the left in FIG. 15. In the instance shown in FIG. 15, the torque reaches the maximum value at phase-current β=13 degrees. Based on the foregoing discussion, in the region where the total torque fluctuates only a little and yet the total torque sufficient for the driving is reserved, the switching of inverter 20 is controlled, considering the motor current, such that current-phase β=10 degrees is achieved. This control mode is referred to as a steady medium speed mode.

In the case of using a field weakening for obtaining a greater rpm, the switching of inverter 20 is controlled such that current-phase β further increases (max. 30 degrees). This control obtains the total torque on the right side from the maximum point of β=13 degrees, and the total torque obtained becomes almost flat, and yet, both of the rpm and the refrigerating cycle of the motor become stable, so that a stable operation can be expected. This control mode is referred to as a steady high-speed mode.

Figure 16:
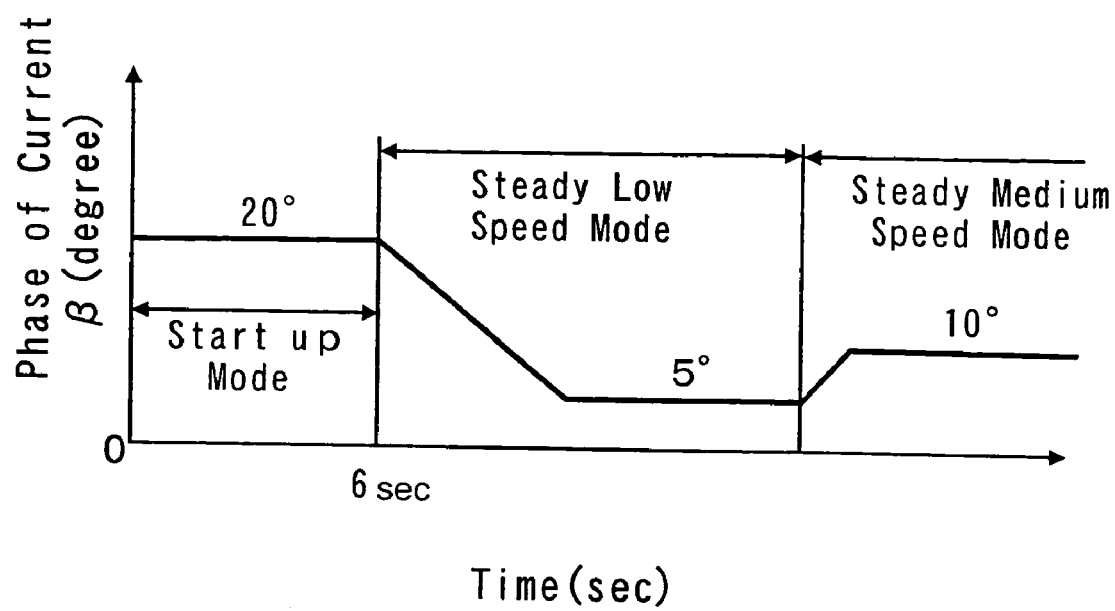
FIG. 16 illustrates a relation between current phase and time in accordance with an exemplary embodiment of the present invention.

FIG. 16 shows a timing chart illustrating relations between phase-difference β (current-phase) and time in the start-up mode, steady low-speed mode, and steady medium-speed mode. In the instance shown in FIG. 16, the start-up mode lasts 6 seconds from the start and β=20 degrees is uniquely kept. Then the current-phase moves on to β=5 degrees in the steady low-speed mode, and the current-phase moves on to β=10 degrees in the steady medium-speed mode.

Figure 17:
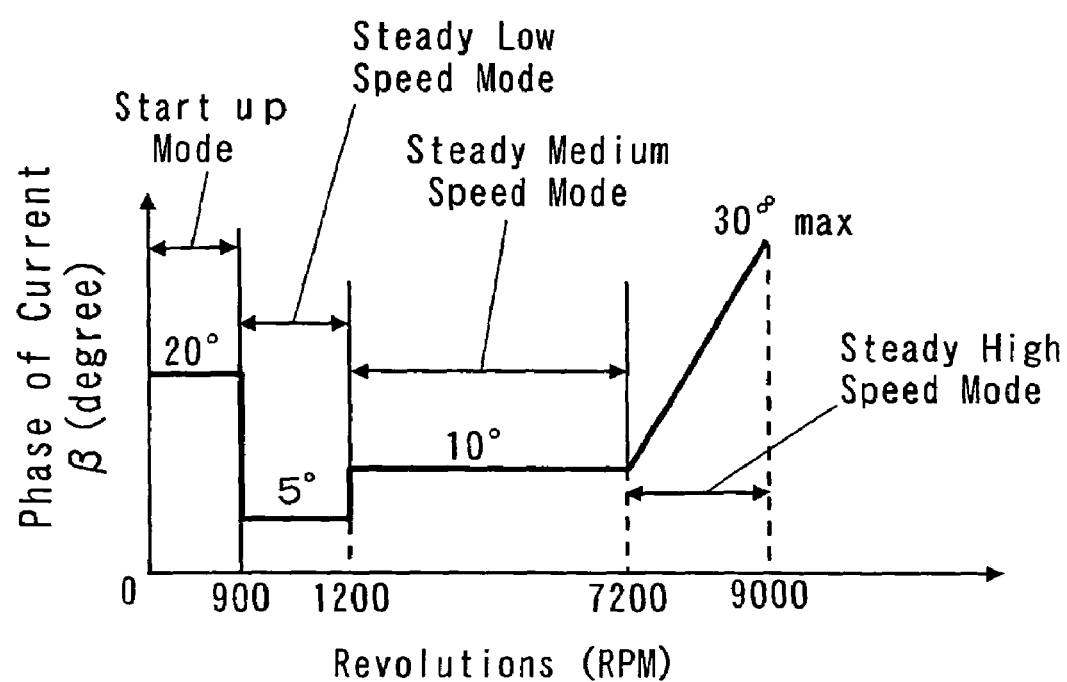
FIG. 17 illustrates a relation between current phase and rpm of the motor in accordance with an exemplary embodiment of the present invention.

FIG. 17 shows an output content of a control signal, where the content illustrates relations between phase difference β and the rpm of the motor in the start-up mode, steady low-speed mode, steady medium-speed mode, and steady high-speed mode.

In the instance shown in FIG. 17, the motor operates in the start-up mode with β=20 degrees until the motor reaches 900 rpm or lapse of 6 seconds after the start, whichever the faster one. Then the motor operates in the steady low-speed mode with β=5 degrees until the motor reaches 1200 rpm, next, the motor operates in the steady medium-speed mode with β=10 degrees until 7200 rpm. Further, the current-phase becomes greater up to β=30 degrees in the steady high-speed mode and the motor is controlled to reach max. 9000 rpm.

Figure 18:
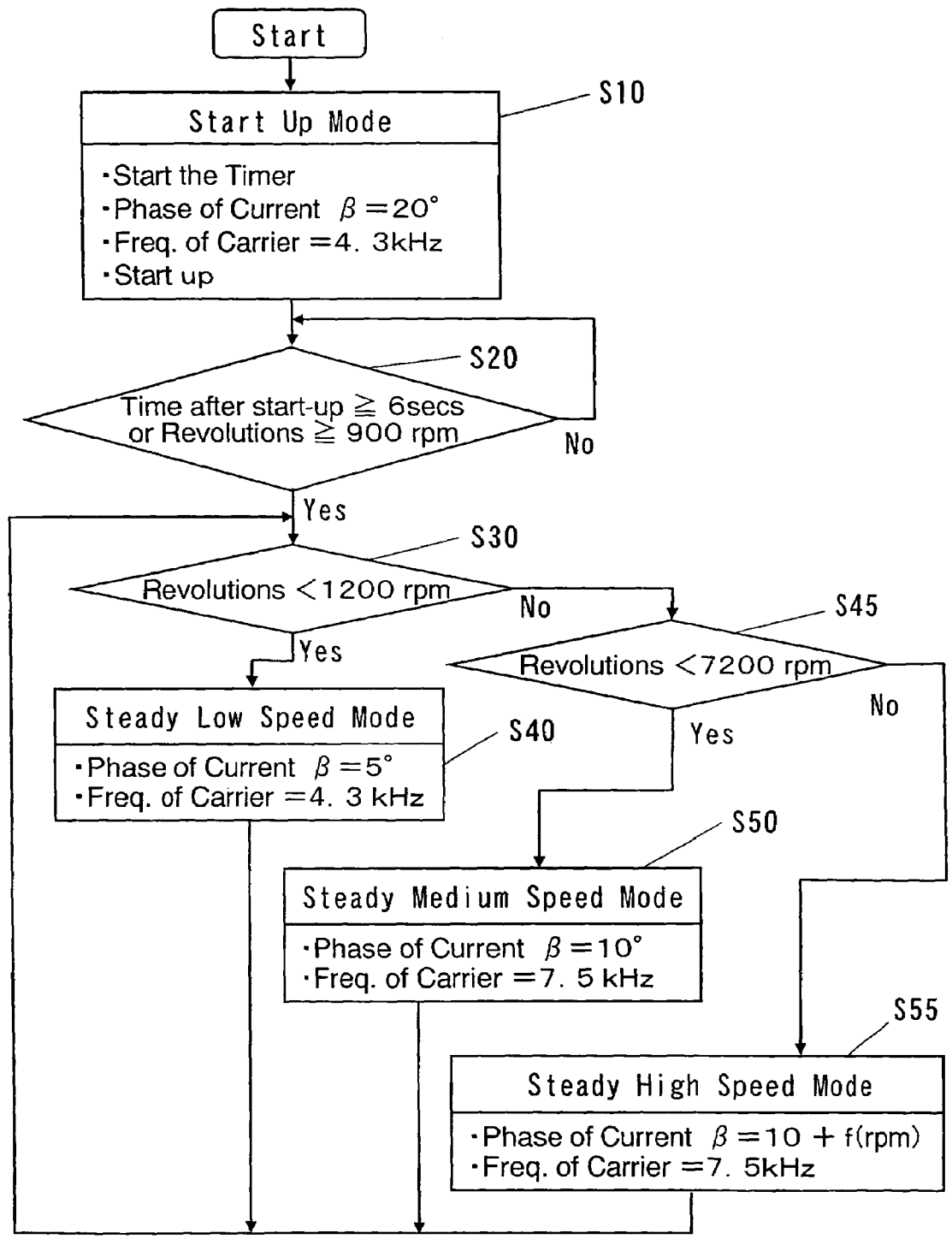
FIG. 18 shows a flowchart illustrating a control (selecting a condition of reducing a current phase) including respective operation modes in accordance with an exemplary embodiment of the present invention.

FIG. 18 shows a flowchart illustrating the control including the foregoing operation modes. At the start, the compressor driver is set in the start-up mode, and the timer starts (step S10). In step 10, current-phase β is set at 20 degrees, and carrier frequency is set at 4.3 kHz before the operation starts. The reason why the carrier frequency is set at rather a low level is that a lower rpm will positively obtain resolving power, and a time for feeding power within one carrier is obtained so that the current can be detected with ease. The low carrier frequency also produces the following benefits: the time for feeding power within one carrier can be adjusted correctly with ease, and phase-current β can be controlled with ease, and greater torque is obtainable with accuracy.

Next, it is determined whether or not the timer counts 6 seconds, or whether or not the actual rpm reaches 900 rpm (step S20). If the determination in step S20 is "No", this item is determined again, and if the determination is "Yes", the control moves on to step S30.

Next, it is determined whether or not an actual rpm is less than 1200 rpm (step S30). If "Yes", the control moves on to step S40. If "No", the control moves on to step S45.

In step S40, the motor is set in the steady low-speed mode, and the current-phase is set at β=5 degrees, the carrier frequency is set at 4.3 kHz. The reason why the carrier frequency is set at rather a low level is already described in step S10. This setting allows controlling the current-phase with ease and preventing the motor from abnormal operation.

On the other hand, in step S45, it is determined whether or not an actual rpm is less than 7200 rpm. If the determination is "Yes", the control moves on to step S50. If "No", the control moves on to step S55. In step S50, the motor is set in the steady medium-speed mode, and the current-phase is set at β=10 degrees, the carrier frequency is set at 7.5 kHz. In step S55, the motor is set in the steady high-speed mode, and the current-phase is set at β=10 degrees plus a value proportionate to the rpm {f (rpm)} because of the field weakening, the carrier frequency is set at 7.5 kHz.

Then the control moves back to step S30, and repeats the control following the flowchart shown in FIG. 18.

If motor M is halted due to the temperature adjustment or the like, and motor M needs to restart, the control is carried out following the foregoing flowchart from step S10. In other words, independent of ON/OFF of operating the air-conditioner, each start of the compressor at intermittent operations involved in adjusting a temperature can be controlled in a similar manner to what is discussed above.

In the foregoing embodiment, an IPM motor is used; however, an SPM (surface permanent magnet) motor can be used with a similar advantage. Not only when a motor starts, but also when a refrigerating cycle falls in a transient state, a delay of current-phase β in advance allows the motor to operate in a stable manner. This embodiment is applicable not only to the refrigerating cycle but also to high-torque start of a motor. This embodiment is also applicable to driving a compressor coupled to a motor on a belt. In this embodiment, the three-phase modulation is taken for example; however, the control method of this embodiment is applicable to a two-phase modulation.

Figure 19:
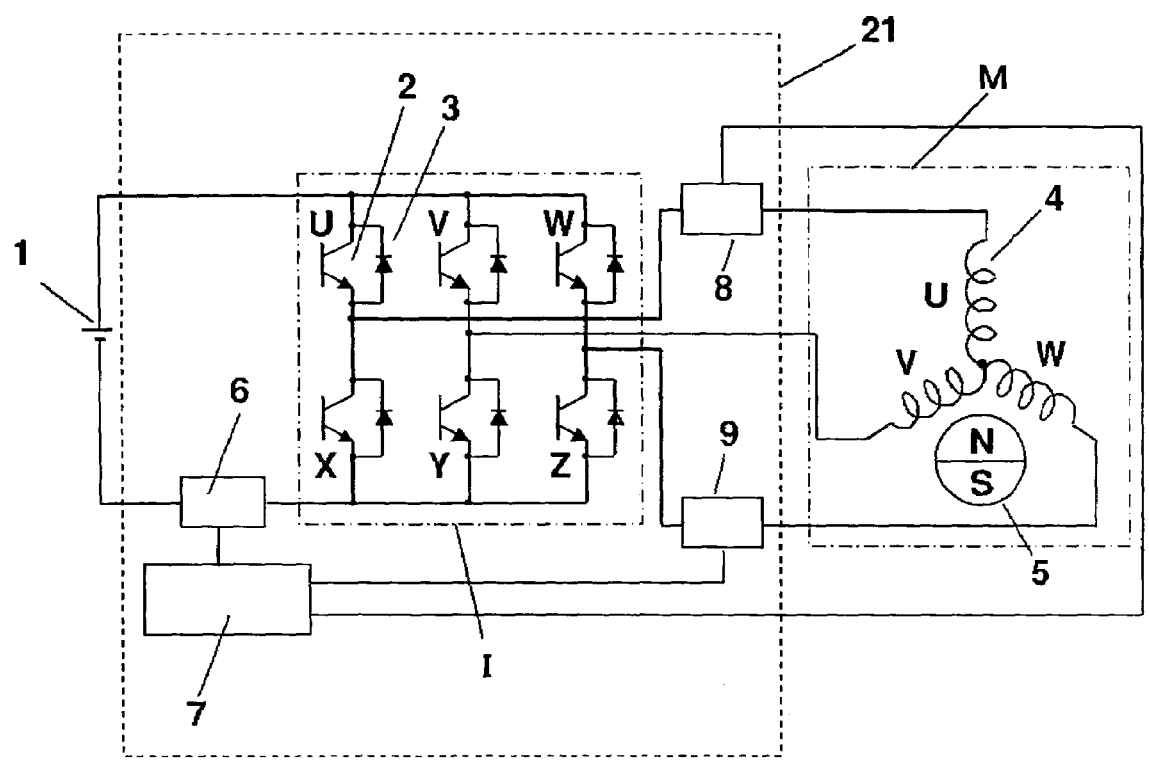
FIG. 19 shows a schematic circuit diagram of another compressor driver in accordance with an exemplary embodiment of the present invention.

FIG. 19 shows another circuit in accordance with the exemplary embodiment of the present invention. In FIG. 19, two current sensors are added to the circuit shown in FIG. 1, namely, current sensor 8 for detecting a current of phase-U of inverter 21 and current sensor 9 for phase-W. Other points remain unchanged from the circuit shown in FIG. 1, so that the elements in FIG. 19 have the same reference marks as those in FIG. 1, and the descriptions thereof are omitted here.

In the foregoing circuit, sensors 8, 9 detect respectively the phase-currents of phase-U and phase-W. The current of the remaining one-phase can be found by the same method already described above. The control of obtaining the max. torque or any torque at the start under pressure-difference can be done in the same manner already demonstrated above, so that the description about this control is omitted here.

Figure 20:
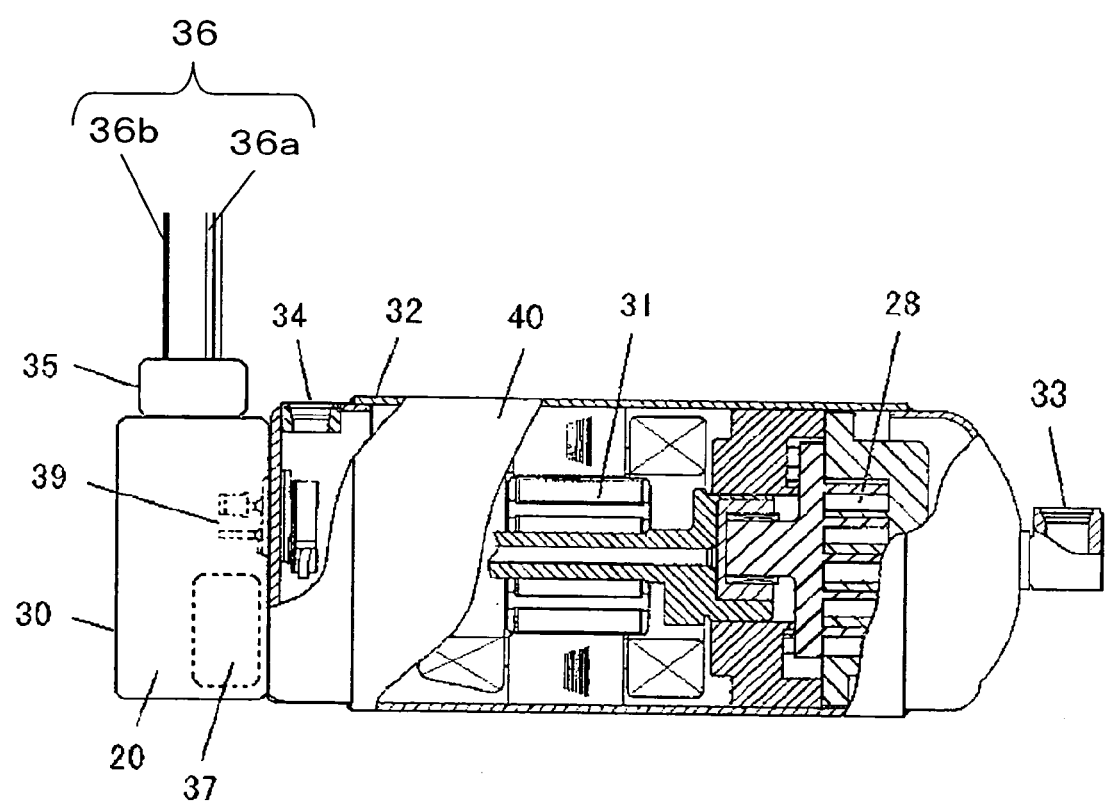
FIG. 20 shows a sectional view of a compressor employing the compressor driver in accordance with an exemplary embodiment of the present invention.

FIG. 20 shows a structure where inverter 20 is mounted solidly to the left-side end of airtight compressor 40. Airtight compressor 40 has a known structure where metal enclosure 32 houses compressing mechanism 28 and motor 31. Refrigerant is sucked through inlet 33 and compressed by compressing mechanism 28 driven by motor 31. (In FIG. 20, a scroll compressing mechanism is employed.) The compressed refrigerant passes through motor 31 (for cooling the motor), and is discharged from outlet 34. Terminal 39 internally coupled to the winding of motor 31 is connected to inverter 20.

Inverter 20 is accommodated in housing 30 which is mounted to compressor 40. Inverter circuit 37, i.e., a heat source, is mounted to housing 30 so that the heat can travel through housing 30 to metal enclosure 32 of compressor 40. In other words, inverter circuit 37 is cooled by the refrigerant in compressor 40 via metal enclosure 32.

Terminal 39 is coupled to an output section of inverter circuit 37. Connecting wire 36 includes power-wire 36a coupled to battery 1 and controlling signal wire 36b coupled to the air-conditioner controller (not shown). Motor 31 employs the concentrated winding instead of the distributed winding because a shorter lateral length is obtainable. The concentrated winding produces greater inductance, so that it takes a longer feed-back time to the diode, thus the concentrated winding makes the position detection difficult, and the control of the position detection also becomes difficult. However, in the case of driving in sine-waveform, a position is detected with a current, so that the detection is controllable.

The compressor incorporating the inverter 20 as discussed above needs to be small and vibration proof. For reducing vibration, it is preferable to use the three-phase modulation, which smoothes a current in sine-waveform and reduces vibration, so that the three-phase modulation is suitable for the compressor driver in accordance with the embodiment of the present invention.

A battery is used as a dc power supply of the compressor driver in this embodiment; however a commercial power can be rectified into dc to be used as the power supply instead of the battery. Any power as long as it is rectified into dc can be used in a home-use compressor driver or other compressor drivers.

The compressor driver of the present invention is controlled such that a phase advancement with respect to an induction voltage of the current which flows in the motor is temporarily increased at the start of the compressor, and then reduced. Therefore, even in an unstable status for detecting the rotor position at the start, the phase is advanced up to the current-phase where torque sufficient to start driving under pressure-difference is obtainable, and instantaneous torque of the motor is given off to drive the compressor. Then, the current-phase is delayed in order to realize a stable operation. As a result, the start-performance under pressure difference is positively carried out, and unstable torque fluctuation can be dealt with. Therefore, this compressor driver can positively drive the compressor even if it is employed, e.g., in a vehicle which must bear the load fluctuation of the refrigerating cycle under severe conditions. Thus, the compressor driver of the present invention is suitable for a car air-conditioner.

What is claimed is:

1. A driver of an electric compressor for driving a dc brush-less motor, said driver comprising:
   a power supply; and
   an inverter coupled to said power supply,
   wherein said driver operates such that an ac current having a sine-waveform is output from said inverter to the dc brush-less motor,
   wherein said driver drives a compressing mechanism that sucks fluid, and then compresses and discharges the fluid,
   wherein said driver controls the dc brush-less motor such that, during a start-up mode of driving the dc brush-less motor, a phase of the current of a winding of the dc brush-less motor is advanced with respect to a phase of the induction voltage generated in the winding in order to obtain sufficient torque to start driving the dc brush-less motor,
   wherein said driver controls the dc brush-less motor such that, immediately after the start-up mode is complete, the advancement of the phase of the current of the winding with respect to the phase of the induction voltage generated in the winding is reduced, and
   wherein the dc brush-less motor is an interior permanent magnet (IPM) motor.

2. The driver of claim 1,
   wherein the start-up mode of driving the dc brush-less motor is determined to be complete when a first predetermined length of time passes after the start of driving the dc brush-less motor, or when the dc brush-less motor reaches a first predetermined amount of revolutions per minute (rpm).

3. The driver of claim 1,
   wherein said driver draws instantaneous maximum torque of the dc brush-less motor depending on the advancement of the phase of the current of the winding with respect to the phase of the induction voltage generated in the winding.

4. The driver of claim 1,
wherein the dc brush-less motor is a sensor-less dc brush-less motor which includes a stator winding and a rotor magnet, and
wherein said driver determines a position of the rotor magnet by detecting a current flowing through the stator winding and by calculating the induction voltage based on the detected current.

5. The driver of claim 4, wherein said driver utilizes three-phase modulation.

6. The driver of claim 1,
wherein the start-up mode of driving the dc brush-less motor is determined to be complete when a first predetermined length of time passes after the start of driving the dc brush-less motor.

7. The driver of claim 1,
wherein, during the start-up mode, the phase of the current of the winding is advanced by approximately 20° with respect to the phase of the induction voltage generated in the winding.

8. The driver of claim 2,
wherein the first predetermined length of time is approximately six seconds, and
wherein the first predetermined amount of revolutions per minute (rpm) is approximately 900 rpm.

9. The driver of claim 2,
wherein the dc brush-less motor enters a low speed mode after the completion of the start-up mode,
wherein said driver controls the dc brush-less motor such that the advancement of the phase of the current of the winding with respect to the phase of the voltage generated in the winding is increased after the low speed mode is complete,
wherein the low speed mode of driving the dc brush-less motor is determined to be complete when the dc brush-less motor reaches a second predetermined amount of revolutions per minute (rpm), and
wherein the second predetermined amount of revolutions per minute is higher than the first predetermined amount of revolutions per minute.

10. The driver of claim 9,
wherein the second predetermined amount of revolutions per minute (rpm) is approximately 1200 rpm.

11. The driver of claim 9,
wherein, during the low speed mode, the phase of the current of the winding is advanced by approximately 5° with respect to the phase of the induction voltage generated in the winding.

12. The driver of claim 9,
wherein the dc brush-less motor enters a medium speed mode after the completion of the low speed mode,
wherein said driver controls the dc brush-less motor such that the advancement of the phase of the current of the winding with respect to the phase of the voltage generated in the winding is increased after the medium speed mode is complete,
wherein the medium speed mode of driving the dc brush-less motor is determined to be complete when the dc brush-less motor reaches a third predetermined amount of revolutions per minute (rpm), and
wherein the third predetermined amount of revolutions per minute is higher than the second predetermined amount of revolutions per minute.

13. The driver of claim 12,
wherein the third predetermined amount of revolutions per minute (rpm) is approximately 7200 rpm.

14. The driver of claim 12,
wherein, during the medium speed mode, the phase of the current of the winding is advanced by approximately 10° with respect to the phase of the induction voltage generated in the winding.

15. The driver of claim 1,
wherein said driver controls the dc brush-less motor such that the advancement of the phase of the current is reduced when a given length of time passes.

* * * * *